US010333995B2

(12) United States Patent
Buddenbaum et al.

(10) Patent No.: US 10,333,995 B2
(45) Date of Patent: Jun. 25, 2019

(54) PROVIDING OF RECOMMENDATIONS DETERMINED FROM A COLLABORATION SESSION SYSTEM AND METHOD

(71) Applicant: International Business Machines Corporation, Armonk, NY (US)

(72) Inventors: Donald E. Buddenbaum, Raleigh, NC (US); Peter F. Haggar, Raleigh, NC (US); Heather M. Kreger, Louisburg, NC (US); Arnaud J. Le Hors, Santa Clara, CA (US); John V. Meegan, Ridgefield, CT (US); Keith A. Wells, Angier, NC (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 14/162,372

(22) Filed: Jan. 23, 2014

(65) Prior Publication Data

US 2015/0207828 A1    Jul. 23, 2015

(51) Int. Cl.
*G06F 15/16* (2006.01)
*H04L 29/06* (2006.01)

(52) U.S. Cl.
CPC ...... *H04L 65/1053* (2013.01); *H04L 65/1069* (2013.01); *H04L 65/1093* (2013.01); *H04L 65/4046* (2013.01)

(58) Field of Classification Search
CPC ..................................................... H04L 29/06
See application file for complete search history.

(56) References Cited

U.S. PATENT DOCUMENTS

| | | |
|---|---|---|
| 6,754,631 B1 | 6/2004 | Din |
| 7,133,513 B1 | 11/2006 | Zhang |
| 8,352,277 B2 | 1/2013 | Bennett |
| 2006/0080059 A1 | 4/2006 | Stupp et al. |
| 2009/0018839 A1 | 1/2009 | Cooper et al. |
| 2009/0157614 A1* | 6/2009 | Smith ............... G06F 17/30731 |
| 2011/0099006 A1 | 4/2011 | Sundararaman et al. |
| 2011/0113320 A1 | 5/2011 | Neff et al. |

(Continued)

FOREIGN PATENT DOCUMENTS

| | | |
|---|---|---|
| EP | 0 954 848 B1 | 5/2003 |
| JP | 2004-005530 A | 1/2004 |

OTHER PUBLICATIONS

C. Bisdikian et al, "MultiMedia Digital Conferencing: A Web-enabled Multimedia Teleconferencing System" IBM Journal of Research and Development, vol. 42(2), pp. 281-298, 2010.

*Primary Examiner* — John B Walsh
(74) *Attorney, Agent, or Firm* — Brian J. Colandreo, Esq.; Jeffrey T. Placker, Esq.; Holland & Knight LLP

(57) ABSTRACT

A method, computer program product, and computer system for monitoring, at a computing device, at least a portion of a collaboration session provided by one or more participants of the collaboration session. At least the portion of the collaboration session is analyzed to determine a recommendation associated with at least the portion of the collaboration session. A source for information associated with the recommendation is searched based upon, at least in part, analyzing at least the portion of the collaboration session. At least one participant of the one or more participants is presented the recommendation and the information associated with the recommendation.

17 Claims, 5 Drawing Sheets

(56) References Cited

U.S. PATENT DOCUMENTS

2012/0239761 A1* 9/2012 Linner ................ G06F 17/2765
709/206
2013/0080521 A1 3/2013 Souza et al.
2013/0124631 A1* 5/2013 Rosansky ........... H04L 65/1069
709/204

* cited by examiner

PROVIDING OF RECOMMENDATIONS DETERMINED FROM A COLLABORATION SESSION SYSTEM AND METHOD

BACKGROUND

The advent of the Internet and the Web has helped address example issues involving access to information. With access to large amounts of information, one may face a challenge of, e.g., sorting through such available information and finding what may be pertinent in a timely manner. For instance, during a collaboration session (e.g., conference call), one or more questions may arise for which none of the participants may have the answer readily available and for which research may be required before further progress may be made. In the example, one of the participants may endeavor to subsequently do the research after the conference call and report back to the participants later on.

BRIEF SUMMARY OF DISCLOSURE

In one implementation, a method, performed by one or more computing devices, may include but is not limited to monitoring, at a computing device, at least a portion of a collaboration session provided by one or more participants of the collaboration session. At least the portion of the collaboration session may be analyzed to determine a recommendation associated with at least the portion of the collaboration session. A source for information associated with the recommendation may be searched based upon, at least in part, analyzing at least the portion of the collaboration session. At least one participant of the one or more participants may be presented the recommendation and the information associated with the recommendation.

One or more of the following features may be included. At least the portion of the collaboration session may include at least one of audio data and text data. Analyzing at least the portion of the collaboration session may include transcribing the audio data. Presenting the recommendation and the information associated with the recommendation may include determining whether a trigger has occurred to present the recommendation and the information associated with the recommendation. The trigger may include at least one of receiving a prompt by the at least one participant of the one or more participants, detecting uncertainty from the at least one participant of the one or more participants, and determining an end of the collaboration session. Presenting the recommendation and the information associated with the recommendation may include presenting the recommendation and the information associated with the recommendation via at least one of audio and text. Searching the source for information associated with the recommendation may include searching the source for information associated with the recommendation according to one or more search preferences.

In another implementation, a computing system includes a processor and a memory configured to perform operations that may include but are not limited to monitoring at least a portion of a collaboration session provided by one or more participants of the collaboration session. At least the portion of the collaboration session may be analyzed to determine a recommendation associated with at least the portion of the collaboration session. A source for information associated with the recommendation may be searched based upon, at least in part, analyzing at least the portion of the collaboration session. At least one participant of the one or more participants may be presented the recommendation and the information associated with the recommendation.

One or more of the following features may be included. At least the portion of the collaboration session may include at least one of audio data and text data. Analyzing at least the portion of the collaboration session may include transcribing the audio data. Presenting the recommendation and the information associated with the recommendation may include determining whether a trigger has occurred to present the recommendation and the information associated with the recommendation. The trigger may include at least one of receiving a prompt by the at least one participant of the one or more participants, detecting uncertainty from the at least one participant of the one or more participants, and determining an end of the collaboration session. Presenting the recommendation and the information associated with the recommendation may include presenting the recommendation and the information associated with the recommendation via at least one of audio and text. Searching the source for information associated with the recommendation may include searching the source for information associated with the recommendation according to one or more search preferences.

In another implementation, a computer program product resides on a computer readable storage medium that has a plurality of instructions stored on it. When executed by a processor, the instructions cause the processor to perform operations that may include but are not limited to monitoring at least a portion of a collaboration session provided by one or more participants of the collaboration session. At least the portion of the collaboration session may be analyzed to determine a recommendation associated with at least the portion of the collaboration session. A source for information associated with the recommendation may be searched based upon, at least in part, analyzing at least the portion of the collaboration session. At least one participant of the one or more participants may be presented the recommendation and the information associated with the recommendation.

One or more of the following features may be included. At least the portion of the collaboration session may include at least one of audio data and text data. Analyzing at least the portion of the collaboration session may include transcribing the audio data. Presenting the recommendation and the information associated with the recommendation may include determining whether a trigger has occurred to present the recommendation and the information associated with the recommendation. The trigger may include at least one of receiving a prompt by the at least one participant of the one or more participants, detecting uncertainty from the at least one participant of the one or more participants, and determining an end of the collaboration session. Presenting the recommendation and the information associated with the recommendation may include presenting the recommendation and the information associated with the recommendation via at least one of audio and text. Searching the source for information associated with the recommendation may include searching the source for information associated with the recommendation according to one or more search preferences.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
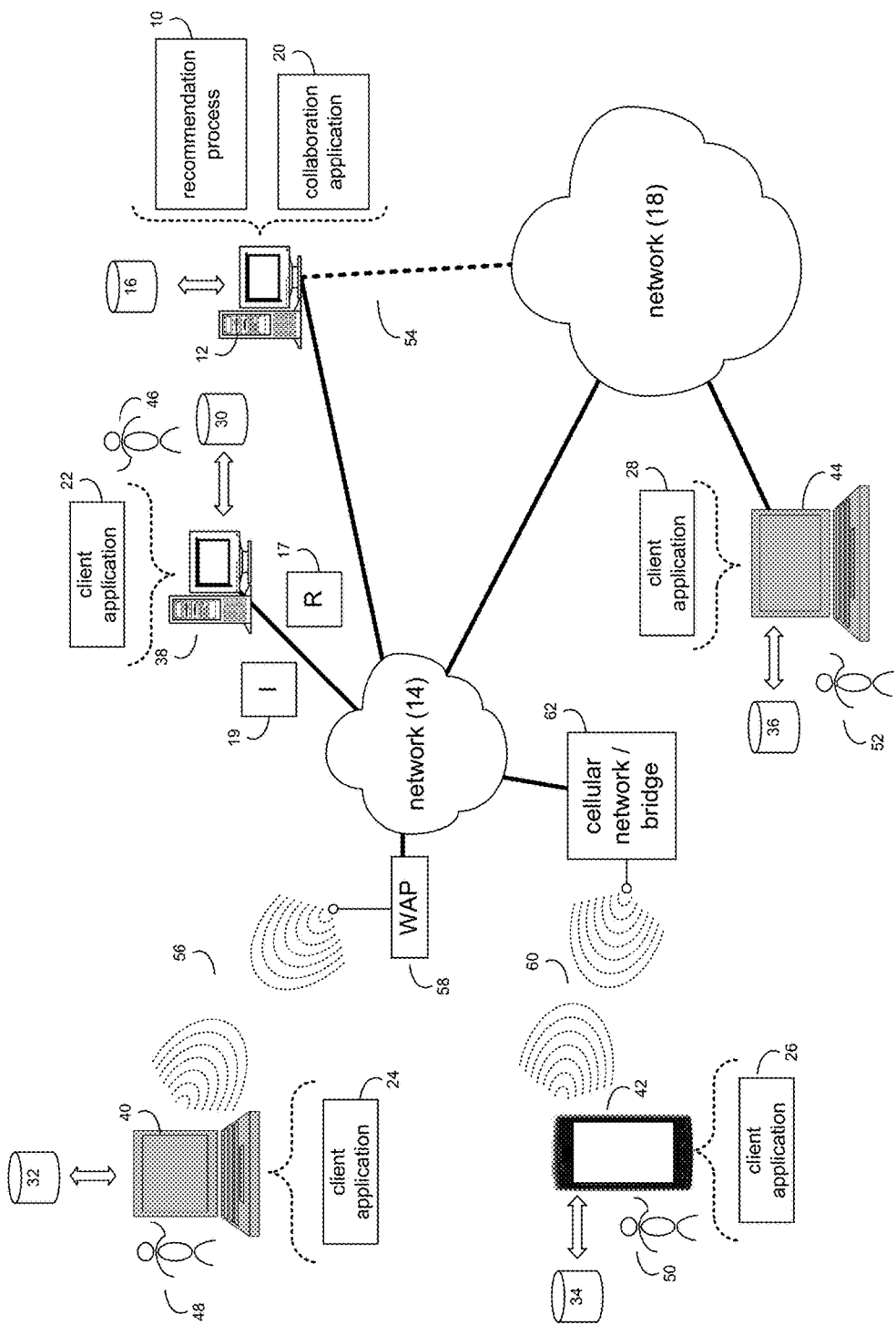
FIG. 1 is an illustrative diagrammatic view of a recommendation process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown recommendation process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, recommendation process 10 may monitor, at a computing device, at least a portion of a collaboration session provided by one or more participants of the collaboration session. At least the portion of the collaboration session may be analyzed to determine a recommendation (e.g., recommendation 17) associated with at least the portion of the collaboration session. A source for information associated with the recommendation may be searched based upon, at least in part, analyzing at least the portion of the collaboration session. At least one participant of the one or more participants may be presented the recommendation and the information (e.g., information 19) associated with the recommendation.

The instruction sets and subroutines of recommendation process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Recommendation process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a collaboration application (e.g., collaboration application 20), examples of which may include, but are not limited to, e.g., a web conferencing application, a video conferencing application, a voice-over-IP application, a video-over-IP application, or other application that allows for virtual meeting and/or remote collaboration. Recommendation process 10 and/or collaboration application 20 may be accessed via client applications 22, 24, 26, 28. Recommendation process 10 may be a stand alone application, or may be an applet/application/script that may interact with and/or be executed within collaboration application 20, a component of collaboration application 20, and/or one or more of client applications 22, 24, 26, 28. Collaboration application 20 may be a stand alone application, or may be an applet/application/script that may interact with and/or be executed within recommendation process 10, a component of recommendation process 10, and/or one or more of client applications 22, 24, 26, 28. One or more of client applications 22, 24, 26, 28 may be a stand alone application, or may be an applet/application/script that may interact with and/or be executed within and/or be a component of recommendation process 10 and/or collaboration application 20. Examples of client applications 22, 24, 26, 28 may include, but are not limited to, e.g., a web conferencing application, a video conferencing application, a voice-over-IP application, a video-over-IP application, voice recognition, real-time speech/textual analysis and/or speech/textual synthesis applications, or other application that allows for audio/textual analysis, virtual meeting and/or remote collaboration, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of recommendation process 10 (and vice versa). Accordingly, recommendation process 10 may be a purely server-side application, a purely client-side application, or a hybrid server-side/client-side application that is cooperatively executed by one or more of client applications 22, 24, 26, 28 and/or recommendation process 10.

One or more of client applications 22, 24, 26, 28 may be configured to effectuate some or all of the functionality of collaboration application 20 (and vice versa). Accordingly, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, recommendation process 10, and collaboration application 20, taken singly or in any combination, may effectuate some or all of the same functionality, any description of effectuating such functionality via one or more of client applications 22, 24, 26, 28, recommendation process 10, collaboration application 20, or combination thereof, and any described interaction(s) between one or more of client applications 22, 24, 26, 28, recommendation process 10, collaboration application 20, or combination thereof to effectuate such functionality, should be taken as an example only and not to limit the scope of the disclosure.

Users 46, 48, 50, 52 may access computer 12 and recommendation process 10 (e.g., using one or more of client electronic devices 38, 40, 42, 44) directly through network 14 or through secondary network 18. Further, computer 12 may be connected to network 14 through secondary network 18, as illustrated with phantom link line 54. Recommendation process 10 may include one or more user interfaces, such as browsers and textual or graphical user interfaces, through which users 46, 48, 50, 52 may access recommendation process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
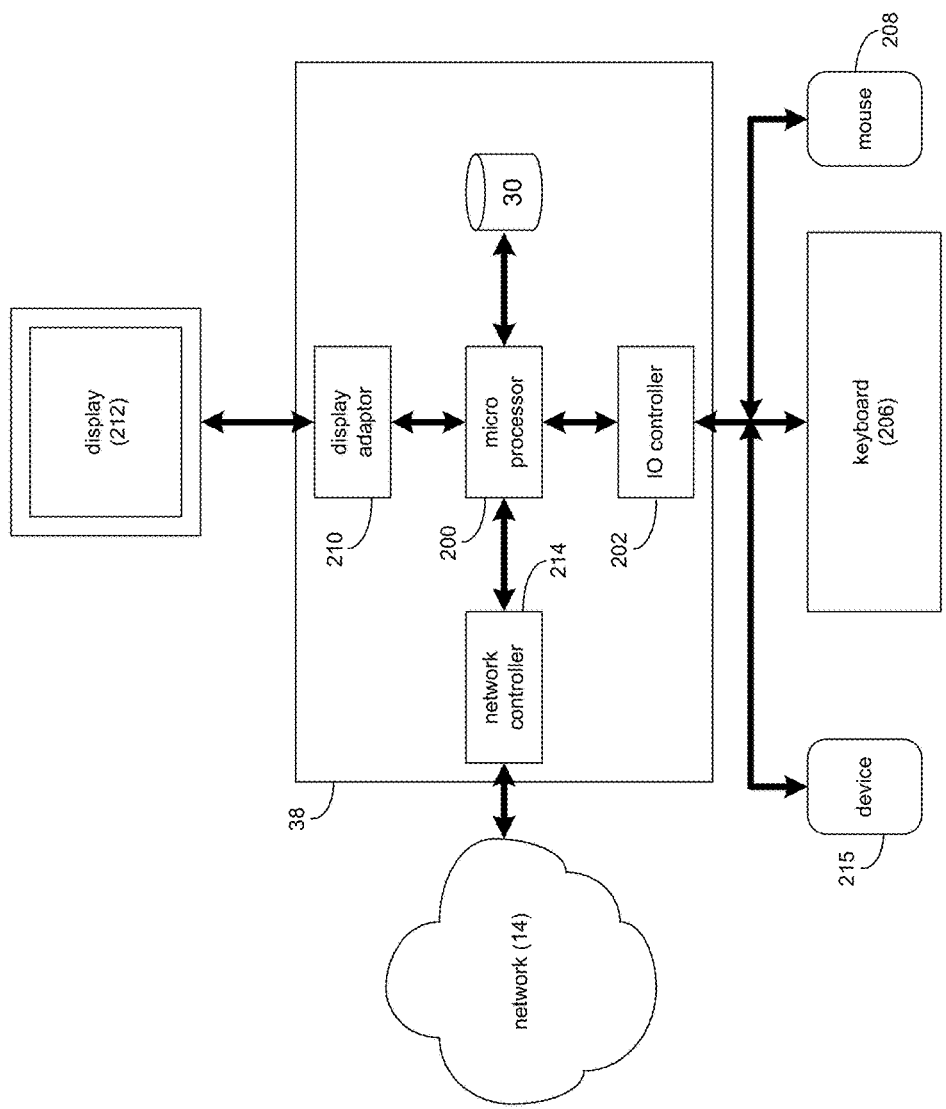
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, recommendation process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Figure 3:
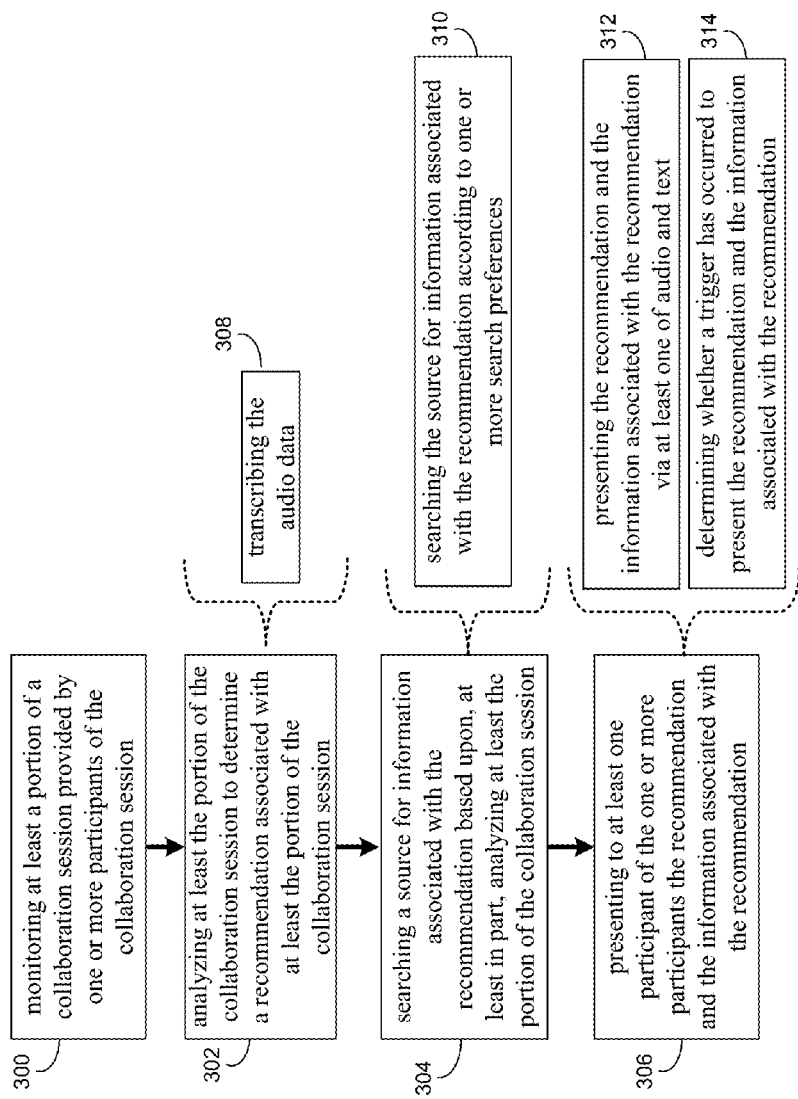
FIG. 3 is an illustrative flowchart of the recommendation process of FIG. 1 according to one or more implementations of the present disclosure.
Figure 4:
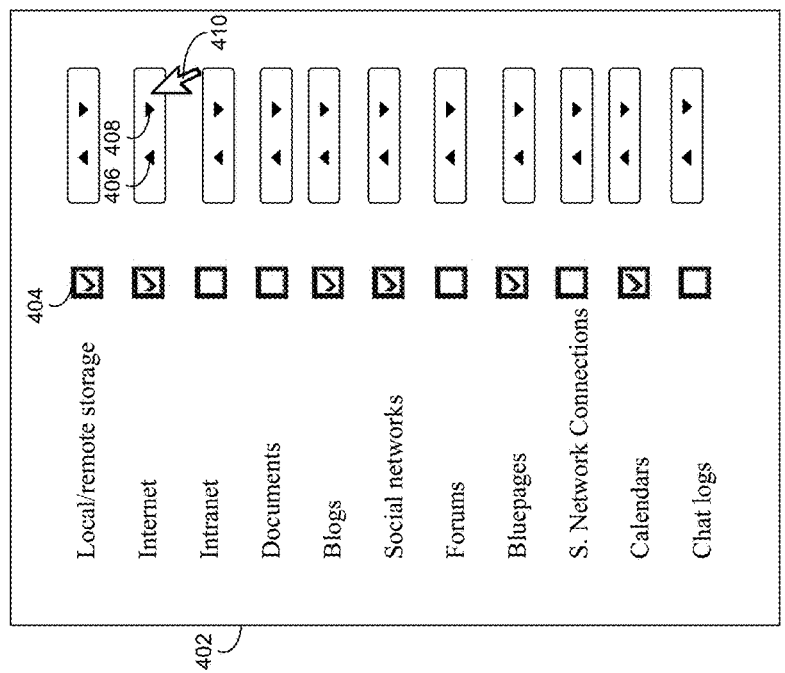
FIG. 4 is an illustrative diagrammatic view of a screen image displayed by the recommendation process of FIG. 1 according to one or more implementations of the present disclosure.
Figure 5:
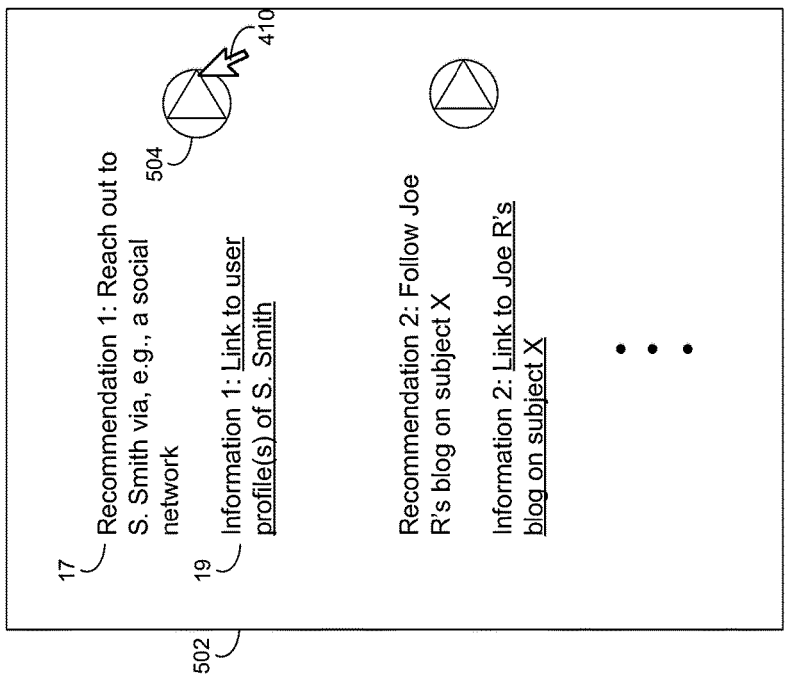
FIG. 5 is an illustrative diagrammatic view of a screen image displayed by the recommendation process of FIG. 1 according to one or more implementations of the present disclosure.

The Recommendation Process:

As discussed above and referring also to FIGS. 3-5, recommendation process 10 may monitor 300, at a computing device, at least a portion of a collaboration session provided by one or more participants of the collaboration session. At least the portion of the collaboration session may be analyzed 302 by recommendation process 10 to determine a recommendation associated with at least the portion of the collaboration session. A source for information associated with the recommendation may be searched 304 by recommendation process 10 based upon, at least in part, analyzing at least the portion of the collaboration session. Recommendation process 10 may present 306 to at least one participant of the one or more participants the recommendation and the information associated with the recommendation.

As will be discussed in greater detail below, unlike a general transcription of what is being said during a conference call, recommendation process 10 may add recommendations and information by providing pertinent references to, e.g., people or documents, which may not have been brought up by the participants during the conference call.

For example, in some implementations, recommendation process 10 may monitor 300, at a computing device, at least a portion of a collaboration session provided by one or more participants of the collaboration session. For instance, assume for example purposes only that participants (e.g., users 46, 48, and 50) are conducting a collaboration session (e.g., conference call) with each other using, e.g., a voice-over-IP application via collaboration application 20. It will be appreciated that users 46, 48, and 50 may also be conducting the collaboration session in person. In the example, at least the portion of the collaboration session may include at least one of audio data and text data. For instance, as each user speaks with each other, e.g., via device 215, which may include but is not limited to an audio input device (e.g., a microphone), device 215 may receive the audio data. The microphone may be a stand alone microphone, or may be part of a telephonic device utilized during the conference call. In some implementations, collaboration application 20 may include an Instant Messaging application, which may enable each user to utilize (e.g., keyboard 206) to communicate with one or more other users participating in the conference call via textual data. In the above example(s), recommendation process 10 may monitor 300 some or all of the audio data and textual data that is received, or transmitted, by one or more of the participants, e.g., during the collaboration session, and/or at other times outside of the collaboration session.

In some implementations, at least the portion of the collaboration session may be analyzed 302 by recommendation process 10 to determine a recommendation (e.g., recommendation 17) associated with at least the portion of the collaboration session. For example, in some implementations, as users 46, 48, and 50 speak into the microphone of device 215 to provide the audio data, or send in instant messages to provide textual data, recommendation process 10 may analyze what is being said, e.g., in real-time, and as will be discussed in greater detail below, may search for pertinent information that may be provided to one or more of the participants (e.g., users 46, 48, and 50). For instance, assume for example purposes only that during the conference call, user 46 asks the question, "Should we contact S. Smith about subject X? She has a 1 hour meeting weekly about subject X", which may be received as audio data via device 215. In the example, recommendations process 10 may determine what information to search for (as will be discussed in greater detail below) and what recommendations to provide. For example, based upon the above-noted analyzed 302 audio data, recommendations process 10 may determine that user 46 should reach out to S. Smith via, e.g., a social network.

As another example, assume that user 48 responds to user 46 by stating, "Joe R. discusses subject X daily." In the example, based upon analysis 302 of the above-noted statement, recommendations process 10 may determine that user 46 and/or user 48 should follow Joe R's blog on subject X, or other medium, such as following Joe R. via a social network.

In some implementations, analyzing 302 at least the portion of the collaboration session may include recommendation process 10 transcribing 308 the audio data, e.g., via voice recognition and/or automated transcription processes or applications. For instance, and continuing with the above example, the spoken words (e.g., audio data) may be analyzed 302, recognized, and transcribed 302 in a textual form, which may be used, along with any of the above-noted textual data received via any Instant Messages, to perform analysis and search for the pertinent information. For instance, assume for example purposes only that during the conference call, user 46 asks the question, "Should we contact S. Smith about subject X? She has a 1 hour meeting weekly about subject X", which may be received as audio data via device 215. In the example, recommendations process 10 may transcribe 308 the question of user 46 into textual data, which may enable recommendation process 10 to analyze 302 and determine what information to search for (as will be discussed in greater detail below) and what recommendations to provide, as discussed above. Analyzing 302 at least the portion of the collaboration session may include, for example, identifying key terms within the transcribed audio data and/or within the textual data. Some example algorithms that may be used by recommendation process 10 may include, e.g., Hilltop algorithm and Stemming algorithm.

In some implementations, a source for information associated with the recommendation may be searched 304 by recommendation process 10 based upon, at least in part, analyzing at least the portion of the collaboration session. In some implementations, the source for information may include but is not limited to local/remote storage of client electronic devices, the internet, intranet, e.g., documents, blogs, social networks, forums, bluepages, social network connections, calendars, chat logs, etc.

For example, and continuing with the above example where user 46 asks the question, "Should we contact S. Smith about subject X? She has a 1 hour meeting weekly about subject X", recommendations process 10 may determine a recommendation that user 46 should reach out to S. Smith via, e.g., a social network. For example, recommendation process 10 may analyze 302 at least the portion of the collaboration session and may identify S. Smith as one key term that may be a name. Based upon, at least in part, the key term "S. Smith" being a name, recommendation process 10 may identify social networking platforms and/or services as a source for information, e.g., that may suitably be searched 304. In the example, recommendation process 10 may search 304 one or more social networking sites to determine if S. Smith has any user profiles associated with the one or more social networking sites. In addition to identifying "S. Smith" as a potential key term that may be a name, recommendations process 10 may also identify "subject X" as a potential key term. In an illustrative example, upon identifying one or more social networking profiles for "S. Smith," recommendations process 10 may search 304 the one or more social networking profiles for "S. Smith" relative to the key term "subject X." Various additional/alternative key term identification and/or searching methodologies may be implemented.

Continuing with the other example where user 48 responds to user 46 by stating, "Joe R. discusses subject X daily." recommendations process 10 may determine a recommendation that user 46 and/or user 48 (and/or user 50) should follow Joe R's blog on subject X, or other medium, such as following Joe R. via a social network. The recommendation to follow Joe R's block on subject X may be based upon, at least in part, identifying "Joe R" as a potential key term that may be a name, and/or identifying "subject X" as being a potential key term. In the example, recommendation process 10 may search 304 one or more social networking sites and/or blogs to determine if Joe. R. has any user profiles associated with the one or more social networking sites and/or blogs on subject X.

In some implementations, searching 304 the source(s) for information associated with the recommendation may include recommendation process 10 searching 310 the source for information associated with the recommendation according to one or more search preferences. For example, and referring at least to FIG. 4, recommendation process 10 may provide a user interface (e.g., user interface 400) that may enable one or more of users 46, 48, and 50 to set up a user preference profile (e.g., user preference profile 402) (or other configuration mechanism), which may dictate such things as, e.g., where recommendations process 10 may search 304 for information, and in what priority. For example, assume that user preference profile 402 is associated with, e.g., user 46. In the example, the search 304 for information associated with the recommendation may include a search 310 of sources that include local/remote storage, the internet, blogs, social networks, blue pages, and calendars, which may have been selected by user 46 by checking objects 404. In the example, the search 304 for information associated with the recommendation may include a search 310 of the above-noted checked sources in the particular order shown, which may be configured by user 46 by using, e.g., cursor 406 of mouse 208 to move each source up or down via object 406 (e.g., "up arrow") and object 408 (e.g., "down arrow"). It will be appreciated that user interface 400 is an example only, and that other techniques of configuring which sources to search and in what order may be used without departing from the scope of this disclosure. In some implementations, user preference profile 402 may further enable user 46 to input a particular source (e.g., website, document, database, catalog of employees and their skills, etc.) to search. In some implementations, recommendation process 10 may have default settings for which sources to search and in what order.

Recommendation process 10 may present 306 to at least one participant of the one or more participants the recommendation and the information associated with the recommendation. For example, and referring at least to FIG. 5, recommendation process 10 may provide a user interface (e.g., user interface 500) that may enable one or more of users 46, 48, and 50 to receive recommendations 17 and information 19 associated with the recommendation presented 306 by recommendation process 10. In some implementations, presenting 306 the recommendation and the information associated with the recommendation may include recommendation process 10 presenting 312 the recommendation and the information associated with the recommendation via at least one of audio and text. For instance, user interface 500 may include object 502 that may include recommendation 17 and information 19 associated with the recommendation. In the example of text, object 502 may take the form of, e.g., an email, text message, instant message, webpage, inserted in meeting minutes reflecting the time the recommendation was made and the trigger causing the recommendation to be made, a list of recommendations for the participants to consult, or other suitable form.

In some implementations, such as in the example of presenting 312 the recommendation and the information associated with the recommendation via audio, recommendation process 10 may use, e.g., verbal suggestions that may be spoken in the conference call via a speaker (not shown) to present 312 the recommendation and the information. In some implementations, object 502 may include another object (e.g., object 504) that may enable user 46 to use cursor 410 of mouse 208 to play an audio representation of recommendation 17 and information 19.

In some implementations, presenting 306 the recommendation and the information associated with the recommendation may include recommendation process 10 determining 314 whether a trigger has occurred to present 306 the recommendation and the information associated with the recommendation. For example, the trigger may include at least one of recommendation process 10 receiving a prompt by the at least one participant of the one or more participants, recommendation process 10 detecting uncertainty from the at least one participant of the one or more participants, and recommendation process 10 determining an end of the collaboration session.

For instance, assume for example purposes only that the trigger includes, e.g., recommendation process 10 receiving a prompt by the at least one participant of the one or more participants. In the example, recommendation process 10 may determine 314 that, e.g., user 46, has input an explicit prompt to present 306 the recommendation and the information associated with the recommendation. The explicit prompt may include, e.g., an object on a user interface of collaboration application 20, client application 22 or combination thereof, selected by user 46 via cursor 410 of mouse 208, where such a selection may be received by and cause recommendation process 10 to present 306 the recommendation and the information associated with the recommendation as discussed above.

As another example, assume for example purposes only that the trigger includes, e.g., recommendation process 10 detecting uncertainty from the at least one participant of the one or more participants. For instance, recommendation process 10 may analyze the audio and/or text data to detect uncertainty, which may be determined during, e.g., a silence following a question (e.g., "I wonder . . . ", "I don't know", "I'll have to look into that", etc.) following a sentence. For example, uncertainty may be detected by (e.g., Should we contact S. Smith about subject X? She has a 1 hour meeting weekly about subject X. I'll have to look into that."). In the example, detecting uncertainty may cause recommendation process 10 to present 306 the recommendation and the information associated with the recommendation as discussed above. Further, in some implementations, recommendation process 10 may identify one or more key terms based upon, at least in part, detecting uncertainty.

As yet another example, assume for example purposes only that the trigger includes, e.g., recommendation process 10 determining an end of the collaboration session. For instance, recommendation process may determine that the conference call has concluded when, e.g., some or all of the participants have hung up or otherwise left the conference call. As another example, recommendation process may determine that the conference call has concluded when, e.g., audio and/or text data indicates that the conference call is ending (e.g., "Goodbye everyone", "Talk to you all tomorrow"), etc. In the example, determining that the conference call has concluded may cause recommendation process 10 to present 306 the recommendation and the information associated with the recommendation as discussed above.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
monitoring, at a computing device, at least a portion of a collaboration session provided by one or more participants of the collaboration session;
analyzing at least the portion of the collaboration session to determine a recommendation associated with at least the portion of the collaboration session including detecting a communication pattern associated with an expression of uncertainty by at least one participant of the collaboration session in response to a request for information from another participant;
identifying at least one term from at least the portion of the collaboration session based upon, at least in part, analyzing at least the portion of the collaboration session, wherein the at least one term includes at least one of a name and a name relative to a subject;
searching a source for information associated with the recommendation based upon, at least in part, analyzing at least the portion of the collaboration session, wherein searching the source for information associated with the recommendation includes searching the source for information associated with the recommendation according to one or more search preferences, wherein the one or more search preferences are created, via a user interface, from a user preference profile dictating at least one of where the information is searched and in what order of priority, wherein the source is searched using the at least one term identified from at least the portion of the collaboration session and the information associated with the recommendation is responsive to the request for information, wherein searching the source for information, using the at least one term including the name, includes identifying at least one social networking platform relative to the name; and
presenting, via the user interface, to at least one participant of the one or more participants the recommendation and the information associated with the recommendation in response to detecting the communication pattern associated with an expression of uncertainty, wherein presenting the recommendation includes determining which of the at least one social networking platform the at least one participant should use to connect with a party associated with the name.

2. The computer-implemented method of claim 1 wherein at least the portion of the collaboration session includes at least one of audio data and text data.

3. The computer-implemented method of claim 2 wherein analyzing at least the portion of the collaboration session includes transcribing the audio data.

4. The computer-implemented method of claim 1 wherein presenting the recommendation and the information associated with the recommendation includes determining whether a trigger has occurred to present the recommendation and the information associated with the recommendation.

5. The computer-implemented method of claim 4 wherein the trigger includes at least one of receiving a prompt by the at least one participant of the one or more participants, and determining an end of the collaboration session.

6. The computer-implemented method of claim 1 wherein presenting the recommendation and the information associated with the recommendation includes presenting the recommendation and the information associated with the recommendation via at least one of audio and text.

7. A computer program product residing on a non-transitory computer readable storage medium having a plurality of instructions stored thereon which, when executed by a processor, cause the processor to perform operations comprising:
monitoring, at a computing device, at least a portion of a collaboration session provided by one or more participants of the collaboration session;
analyzing at least the portion of the collaboration session to determine a recommendation associated with at least the portion of the collaboration session including detecting a communication pattern associated with an expression of uncertainty by at least one participant of the collaboration session in response to a request for information from another participant;
identifying at least one term from at least the portion of the collaboration session based upon, at least in part, analyzing at least the portion of the collaboration session, wherein the at least one term includes at least one of a name and a name relative to a subject;
searching a source for information associated with the recommendation based upon, at least in part, analyzing at least the portion of the collaboration session, wherein searching the source for information associated with the recommendation includes searching the source for information associated with the recommendation according to one or more search preferences, wherein the one or more search preferences are created, via a user interface, from a user preference profile dictating at least one of where the information is searched and in what order of priority, wherein the source is searched using the at least one term identified from at least the portion of the collaboration session and the information associated with the recommendation is responsive to the request for information, wherein searching the source for information, using the at least one term including the name, includes identifying at least one social networking platform relative to the name; and
presenting, via the user interface, to at least one participant of the one or more participants the recommendation and the information associated with the recommendation in response to detecting the communication pattern associated with an expression of uncertainty, wherein presenting the recommendation includes determining which of the at least one social networking platform the at least one participant should use to connect with a party associated with the name.

8. The computer program product of claim 7 wherein at least the portion of the collaboration session includes at least one of audio data and text data.

9. The computer program product of claim 8 wherein analyzing at least the portion of the collaboration session includes transcribing the audio data.

10. The computer program product of claim 7 wherein presenting the recommendation and the information associated with the recommendation includes determining whether a trigger has occurred to present the recommendation and the information associated with the recommendation.

11. The computer program product of claim 10 wherein the trigger includes at least one of receiving a prompt by the at least one participant of the one or more participants, and determining an end of the collaboration session.

12. The computer program product of claim 7 wherein presenting the recommendation and the information associated with the recommendation includes presenting the recommendation and the information associated with the recommendation via at least one of audio and text.

13. A computing system including a processor and a memory configured to perform operations comprising:
monitoring, at a computing device, at least a portion of a collaboration session provided by one or more participants of the collaboration session;
analyzing at least the portion of the collaboration session to determine a recommendation associated with at least the portion of the collaboration session including detecting a communication pattern associated with an expression of uncertainty by at least one participant of the collaboration session in response to a request for information from another participant;
identifying at least one term from at least the portion of the collaboration session based upon, at least in part, analyzing at least the portion of the collaboration session, wherein the at least one term includes at least one of a name and a name relative to a subject;
searching a source for information associated with the recommendation based upon, at least in part, analyzing at least the portion of the collaboration session, wherein searching the source for information associated with the recommendation includes searching the source for information associated with the recommendation according to one or more search preferences, wherein the one or more search preferences are created, via a user interface, from a user preference profile dictating at least one of where the information is searched and in what order of priority, wherein the source is searched using the at least one term identified from at least the portion of the collaboration session and the information associated with the recommendation is responsive to the request for information, wherein searching the source for information, using the at least one term including the name, includes identifying at least one social networking platform relative to the name; and
presenting, via the user interface, to at least one participant of the one or more participants the recommendation and the information associated with the recommendation in response to detecting the communication pattern associated with an expression of uncertainty, wherein presenting the recommendation includes determining which of the at least one social networking platform the at least one participant should use to connect with a party associated with the name.

14. The computing system of claim 13 wherein at least the portion of the collaboration session includes at least one of audio data and text data.

15. The computing system of claim 14 wherein analyzing at least the portion of the collaboration session includes transcribing the audio data.

16. The computing system of claim 13 wherein presenting the recommendation and the information associated with the recommendation includes determining whether a trigger has occurred to present the recommendation and the information associated with the recommendation.

17. The computing system of claim 16 wherein the trigger includes at least one of receiving a prompt by the at least one participant of the one or more participants, and determining an end of the collaboration session.

* * * * *